(12) United States Patent
Ma et al.

(10) Patent No.: US 12,247,956 B1
(45) Date of Patent: Mar. 11, 2025

(54) RAPID DOT MATRIX MICRO-NANO IMPACT INDENTATION TESTING SYSTEM

(71) Applicant: JILIN UNIVERSITY, Changchun (CN)

(72) Inventors: Zhichao Ma, Changchun (CN); Junming Xiong, Changchun (CN); Guoxiang Shen, Changchun (CN); Ziyi Wu, Changchun (CN); Shuai Tong, Changchun (CN); Zixin Guo, Changchun (CN); Wei Zhang, Changchun (CN); Hongcai Xie, Changchun (CN); Jiazheng Sun, Changchun (CN); Wenyang Zhao, Changchun (CN); Zaizheng Yang, Changchun (CN); Chaofan Li, Changchun (CN); Yicheng Li, Changchun (CN); Boyi Kou, Changchun (CN); Jiakai Li, Changchun (CN); Yifan Liu, Changchun (CN); Hongwei Zhao, Changchun (CN); Luquan Ren, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 0 days.

(21) Appl. No.: 18/763,242

(22) Filed: Jul. 3, 2024

(30) Foreign Application Priority Data

Jun. 18, 2024 (CN) .......................... 202410788296.1

(51) Int. Cl.
*G01N 3/317* (2006.01)
(52) U.S. Cl.
CPC ....... *G01N 3/317* (2013.01); *G01N 2203/001* (2013.01); *G01N 2203/0051* (2013.01);
(Continued)

(58) Field of Classification Search
CPC ............ G01N 3/317; G01N 2203/001; G01N 2203/0676; G01N 2203/0647; G01N 2203/0051
See application file for complete search history.

(56) References Cited

U.S. PATENT DOCUMENTS 11,635,361 B2 * 4/2023 Zhao .................. G01N 3/08
73/800

FOREIGN PATENT DOCUMENTS

| CN | 102441796 B | 5/2012 |
|---|---|---|
| CN | 115020305 A | 9/2022 |

(Continued)

*Primary Examiner* — Jonathan M Dunlap
(74) *Attorney, Agent, or Firm* — Birchwood IP

(57) ABSTRACT

The present invention discloses a rapid dot matrix micro-nano impact indentation testing system. The rapid dot matrix micro-nano impact indentation testing system comprises a three-dimensional electric positioning module, wherein the three-dimensional electric positioning module comprises an XY translation stage and a Z-axis lifting stage; a dot matrix impact indentation module, wherein the dot matrix impact indentation module comprises a three-degree-of-freedom piezoelectric platform arranged on the Z-axis lifting stage, one surface of the three-degree-of-freedom piezoelectric platform is provided with a piezoelectric ceramic actuator, and one end of the piezoelectric ceramic actuator is connected to an indenter; a clamp, wherein the clamp clamps a test piece, and the test piece faces the indenter; and an imaging module, wherein the imaging module comprises a microscope lens. The system can achieve in-situ micro-nano impact indentation test and rapid dot matrix indentation, and has higher indentation precision.

5 Claims, 3 Drawing Sheets

(52) U.S. Cl.
CPC ............... *G01N 2203/0647* (2013.01); *G01N 2203/0676* (2013.01)

(56) References Cited

FOREIGN PATENT DOCUMENTS

| | | | | |
|---|---|---|---|---|
| CN | 116165092 A | 6/2023 | | |
| CN | 118111838 A | 5/2024 | | |
| WO | WO-2018006504 A1 * | 1/2018 | ............... | G01N 3/00 |

* cited by examiner

RAPID DOT MATRIX MICRO-NANO IMPACT INDENTATION TESTING SYSTEM

CROSS-REFERENCE TO RELATED APPLICATIONS

This application claims priority to Chinese Patent Application No. 202410788296.1, filed on Jun. 18, 2024, which is hereby incorporated by reference in its entirety.

TECHNICAL FIELD

The present invention relates to the technical field of micromechanics testing of materials, and specifically to a rapid dot matrix micro-nano impact indentation testing system.

BACKGROUND

Advanced structural and functional materials are important guarantees for the development of aerospace, energy, power and other fields, and are also international leading hotspots. Under the action of impact loads, the micromechanical behavior and deformation, damage and failure mechanisms of key materials in the above fields are unclear, which often leads to major accidents. Micro-nano impact indentation testing can obtain the dynamic mechanical property parameters of materials through micro-damage and reveal the microscopic impact failure mechanism of the materials. The development of the micro-nano impact indentation tester is a major requirement and an urgent need for impact resistance evaluation and optimized design and preparation of key materials in various fields such as aviation equipment, energy and power, and can provide a powerful tool for discovery of new physical properties, new phenomena and new laws.

The micro-nano indentation testing technology and instrument under the quasi-static conditions ($10^{-5}$-$10^{-3}$/s) are mature, a common material quasi-static micro-nano testing method mainly comprises micro-nano indentation and scratching, and mechanical property parameters such as material hardness, elastic modulus, and fracture toughness are obtained by recording load-displacement data of an indenter in the material testing process. However, the instrument cannot meet the requirement of material mechanical property testing under high strain rate conditions ($10^2$-$10^4$/s). Currently, the commonly used impact dynamics testing devices for high strain rate conditions ($10^2$-$10^4$/s) comprise a Hopkinson bar and a pendulum impact tester. However, these devices are usually large in size and energy consumption, and have certain requirements for the placement site and specimen size. In addition, the experimental process is destructive to the materials, and it is difficult to obtain the dynamic mechanical property parameters of the materials through micro-damage.

SUMMARY

To solve at least one of the above problems, the present invention provides a rapid dot matrix micro-nano impact indentation testing system.

The technical solution of the present invention is as follows: a rapid dot matrix micro-nano impact indentation testing system comprises:
a three-dimensional electric positioning module, wherein the three-dimensional electric positioning module comprises an XY translation stage and a Z-axis lifting stage, and the Z-axis lifting stage is arranged on the XY translation stage;
a dot matrix impact indentation module, wherein the dot matrix impact indentation module comprises a three-degree-of-freedom piezoelectric platform arranged on the Z-axis lifting stage, one surface of the three-degree-of-freedom piezoelectric platform is provided with a piezoelectric ceramic actuator, and one end of the piezoelectric ceramic actuator is connected to an indenter through a pressing rod; a piezoelectric stack and a bionic mantis claw with an arc-shaped tail end are arranged in the three-degree-of-freedom piezoelectric platform, and the bionic mantis claw amplifies a stroke of the piezoelectric stack based on a lever principle;
a clamp, wherein the clamp clamps a test piece, and the test piece faces the indenter; and
an imaging module, wherein the imaging module comprises a microscope lens, and the microscope lens is configured to observe and photograph the test piece.

According to one embodiment of the present invention, the XY translation stage comprises a group of servo motors orthogonally arranged, an output end of each servo motor is connected to a fine grinding lead screw, the fine grinding lead screw is connected to a cross guide rail, the Z-axis lifting stage is arranged at an upper part of the cross guide rail, and a side surface of the lifting stage and a side surface of the cross guide rail are both provided with grating rulers.

According to one embodiment of the present invention, an annular support is provided on one surface of the three-degree-of-freedom piezoelectric platform, the piezoelectric ceramic actuator is arranged inside the annular support, a bearing is arranged at one end of the annular support, and the pressing rod passes through the bearing and is connected to the indenter.

Further, a pair of opposite-top wedge blocks are provided inside the other end of the annular support, the opposite-top wedge blocks are arranged between a top of the piezoelectric ceramic actuator and the annular support, a fastening bolt is arranged on at least one side of the annular support, the fastening bolt is configured to apply a transverse force to the opposite-top wedge blocks, and the opposite-top wedge blocks convert the transverse force into a pre-tightening force for the piezoelectric ceramic actuator.

According to one embodiment of the present invention, the pressing rod is connected to a micro-force sensor, a laser Doppler seismometer is provided at an upper part of the dot matrix impact indentation module, and a reflective silicon wafer matched with the laser Doppler seismometer is provided at one end of the pressing rod close to the indenter.

According to one embodiment of the present invention, a mounting plate is provided on one side of the three-degree-of-freedom piezoelectric platform, a sliding plate is provided on the mounting plate, and the imaging module is arranged on the sliding plate.

According to one embodiment of the present invention, the clamp is a pneumatic clamp.

According to one embodiment of the present invention, a mounting rib plate is fixedly provided on one side of the Z-axis lifting stage, a sliding block is provided on the mounting rib plate, and the imaging module is arranged on the sliding block.

Beneficial effects: the system can not only achieve in-situ micro-nano impact indentation test, but also achieve rapid dot matrix indentation, has higher indentation precision, can obtain the micro-area mechanical information of the material, and provides data support for material application;

meanwhile, compared with the prior art, the piezoelectric ceramic actuator has shorter response time and higher impact speed, and can achieve impact under high strain conditions.

Meanwhile, the system has the functions of quasi-static micro-nano indentation and high strain rate impact testing, can simultaneously obtain the time-varying characteristics of impact indentation load and depth, measure the dynamic mechanical property parameters of the material and analyze the residual stress, strain hardening effect and creep behavior of the material, and has the characteristics of high testing precision, surface micro-damage, rich obtained information, simple specimen preparation and the like.

Figure 1:
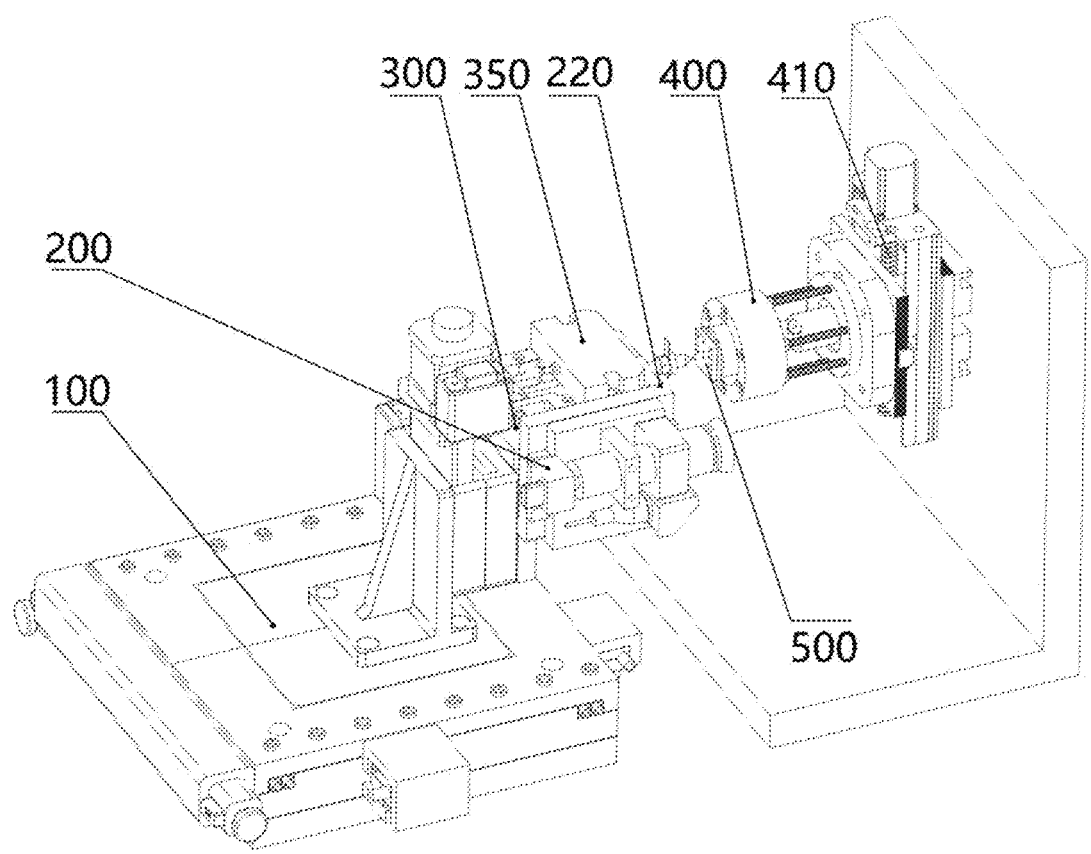
FIG. 1 is a schematic diagram of an overall structure according to the present invention.

In the drawings, 100: three-dimensional electric positioning module, 200: imaging module, 300: dot matrix impact indentation module, 400: clamp, and 500: test piece;
110: XY translation stage, 120: Z-axis lifting stage, 111: servo motor, 112: fine grinding lead screw, 113: cross guide rail, and 114: grating ruler;
210: microscope lens, 220: mounting rib plate, 230: sliding block, and 240: light source;
310: three-degree-of-freedom piezoelectric platform, 320: piezoelectric ceramic actuator, 330: annular support, 340: opposite-top wedge block, 350: laser Doppler seismometer, 360: reflective silicon wafer, 370: micro-force sensor, 311: piezoelectric stack, 312: bionic mantis claw, 313: guide rail, 321: pressing rod, 322: indenter, 331: fastening bolt, and 332: bearing; and 410: movable platform.

DETAILED DESCRIPTION OF THE EMBODIMENTS

The specific implementations of the present invention will be described clearly and completely below with reference to examples and drawings. It is clear that the described embodiments are merely a part rather than all of embodiments of the present invention.

As shown in FIGS. 1 to 5, a rapid dot matrix micro-nano impact indentation testing system comprises:
a three-dimensional electric positioning module 100, wherein the three-dimensional electric positioning module 100 comprises an XY translation stage 110 and a Z-axis lifting stage 120, and the Z-axis lifting stage 120 is arranged on the XY translation stage 110.

Figure 2:
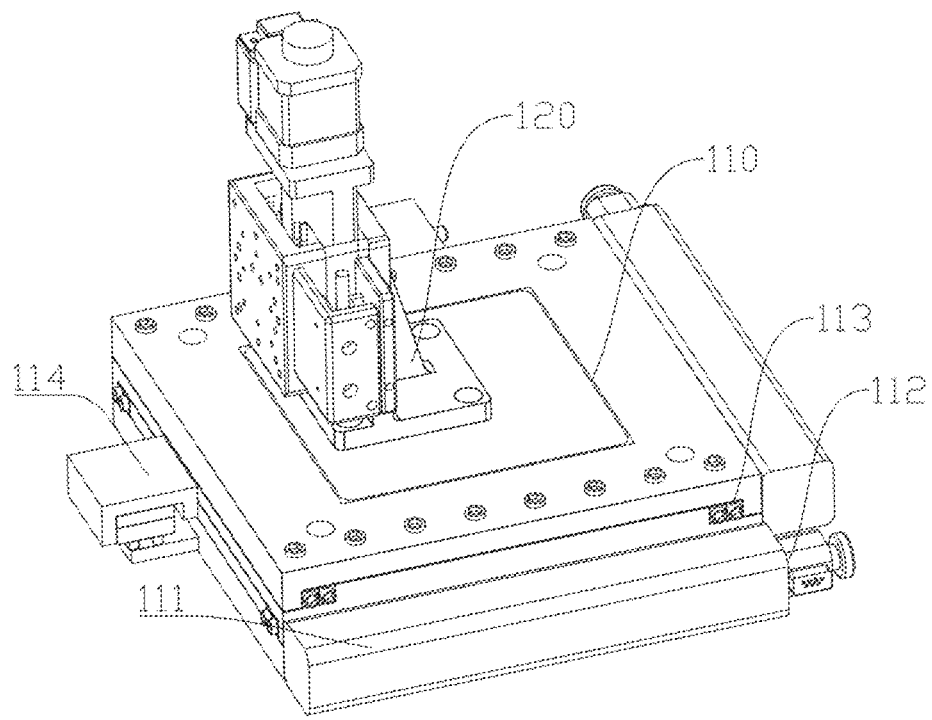
FIG. 2 is a schematic diagram of a structure of a three-dimensional electric positioning module.

Specifically, as shown in FIGS. 1 and 2, the three-dimensional electric positioning module 100 mainly functions to initially position a dot matrix impact indentation module 300. When the dot matrix impact indentation test is performed, an indenter 322 needs to be aligned to a to-be-tested material, and after one impact is completed, the position of the indentation test needs to be immediately replaced to perform the impact indentation test again.

To make the positioning more accurate, in this embodiment, the three-dimensional electric positioning module 100 is provided as the XY translation stage 110 and the Z-axis lifting stage 120, and the Z-axis lifting stage 120 is arranged on the XY translation stage 110, and the Z-axis lifting stage 120 can move in a horizontal direction on the XY translation stage 110. Meanwhile, the dot matrix impact indentation module 300 is arranged on the Z-axis lifting stage 120, and the movement of the dot matrix impact indentation module 300 in a vertical direction can be achieved through the Z-axis lifting stage 120.

To make the displacement more accurate, in this embodiment, a power for the XY translation stage 110 is a group of servo motors 111 arranged orthogonally, an output end of the servo motor 111 is connected to a fine grinding lead screw 112, one end of the fine grinding lead screw 112 is connected to a cross guide rail 113, the cross guide rail 113 drives the Z-axis lifting stage 120 to translate, and the arranged fine grinding lead screw 112 makes the displacement more accurate. Meanwhile, three identical grating rulers 114 are arranged on a side surface of the cross guide rail 113 and a side surface of the Z-axis lifting stage 120. The grating rulers 114 monitor and control the displacement in the X direction, Y direction and Z direction, so that the displacement of the dot matrix impact indentation module 300 can be accurately controlled, making the final impact test position more precise.

The rapid dot matrix micro-nano impact indentation testing system further comprises a dot matrix impact indentation module 300, wherein the dot matrix impact indentation module 300 comprises a three-degree-of-freedom piezoelectric platform 310 arranged on the Z-axis lifting stage 120, one surface of the three-degree-of-freedom piezoelectric platform 310 is provided with a piezoelectric ceramic actuator 320, and one end of the piezoelectric ceramic actuator 320 is connected to an indenter 322 through a pressing rod 321; a piezoelectric stack 311 and a bionic mantis claw 312 with an arc-shaped tail end are arranged in the three-degree-of-freedom piezoelectric platform 310, and the bionic mantis claw 312 amplifies a stroke of the piezoelectric stack 311 based on a lever principle.

Figure 4:
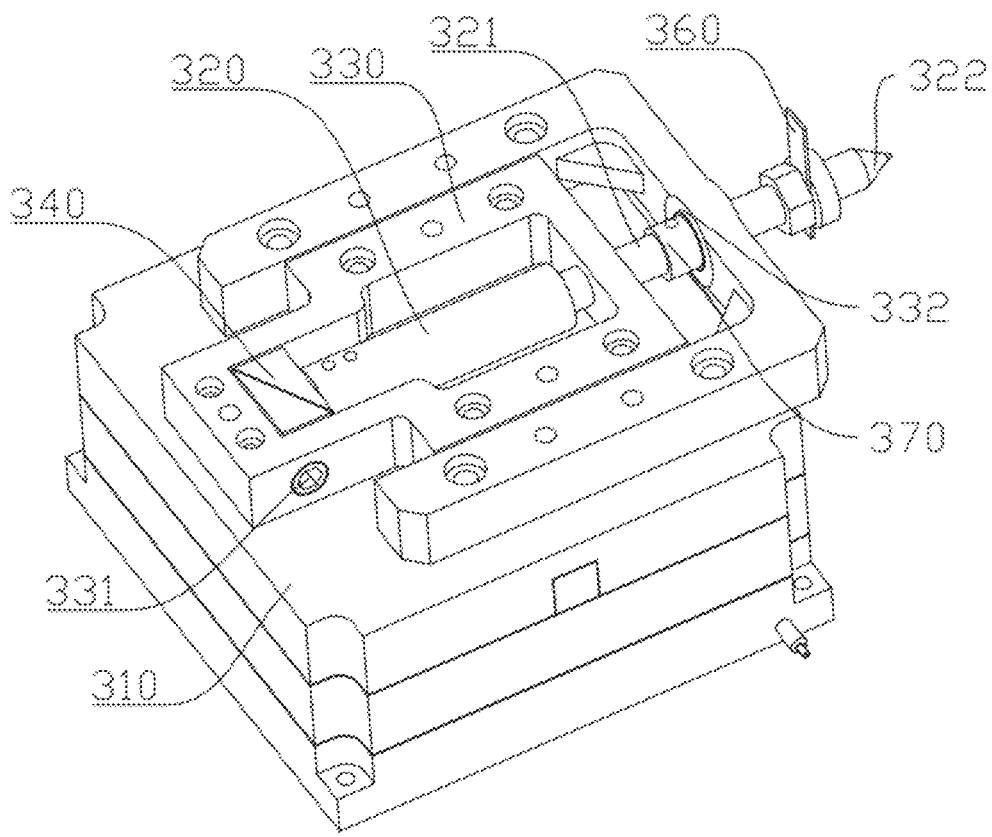
FIG. 4 is a schematic diagram of a structure of a dot matrix impact indentation module.
Figure 5:
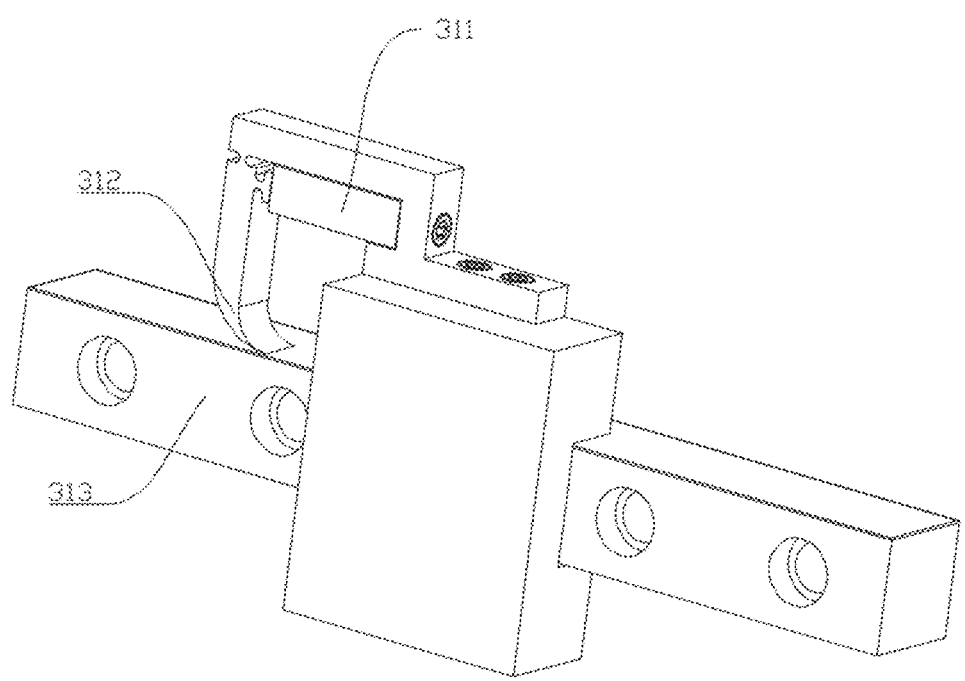
FIG. 5 is a schematic diagram of a structure of a clamp.

As shown in FIGS. 1, 4, and 5, in this embodiment, the dot matrix impact indentation module 300 mainly comprises a three-degree-of-freedom piezoelectric platform 310 and a piezoelectric ceramic actuator 320, wherein the three-degree-of-freedom piezoelectric platform 310 can further adjust the position of the indenter 322 on a microscale, so that the impact test position is more accurate. The piezoelectric ceramic actuator 320 is the primary component for impact testing.

In this embodiment, the difference between the three-degree-of-freedom piezoelectric platform 310 and a conventional piezoelectric platform is that the conventional piezoelectric platform simply adopts a combination of a piezoelectric stack and a flexible hinge to drive a moving guide rail of the piezoelectric platform, so that the piezoelectric platform can perform a tiny displacement and adjust the position of the piezoelectric ceramic actuator 320 at a microscopic level. However, the conventional three-degree-of-freedom piezoelectric platform 310 is poor in motion stability. To solve this problem, the inventors find from a large number of experiments that the flexible hinge is configured as a bionic mantis claw 312 with an arc-shaped tail end, the tail end of the bionic mantis claw 312 is in contact with the guide rail 313, deformation of the piezoelectric stack 311 is transmitted to the guide rail 313 of the three-degree-of-freedom piezoelectric platform 310 through the bionic mantis claw 312, so that the three-degree-of-freedom piezoelectric platform 313 generates displacement in three directions. Meanwhile, the arc-shaped tail end of the bionic mantis claw 312 will ensure that the contact force gradually increases during the slow adhesion process, which helps drive stability; and this also facilitates rapid separation of the jaws with a decreasing contact force during the reverse sliding movement. It has been verified experimentally that the bionic mantis claw 312 can exert the stick-slip concept to the utmost extent, and effectively inhibit rollback due to the fact that 95.5% of effective stroke is obtained. The effective stroke of a conventional lever-type flexible hinge is about 80%, so that compared with the conventional flexible hinge, the bionic mantis claw has a better effect.

To make the movement of the piezoelectric ceramic actuator 320 more accurate, in this embodiment, an annular support 330 is further provided outside the piezoelectric ceramic actuator 320, and the piezoelectric ceramic actuator 320 is fixedly arranged inside the annular support 330. A main body of the piezoelectric ceramic actuator 320 is arranged inside the annular support 330, an output end of the piezoelectric ceramic actuator 320 is provided with a pressing rod 321, the other end of the pressing rod 321 is connected to an indenter 322, the displacement and the impact force generated by the piezoelectric ceramic actuator 320 are transmitted to the indenter 322 through the pressing rod 321, and the impact indentation test is performed on a test piece 500 through the indenter 322. To ensure the stability between the pressing rod 321 and the indenter 322, a bearing 332 is provided at one end of the annular support 330, and the pressing rod 321 passes through the bearing 332 and is arranged outside the annular support 330.

According to the research of the inventors, since this embodiment adopts the mode of direct impact of the piezoelectric ceramic actuator 320, the stroke of the piezoelectric ceramic actuator can reach more than 100 micrometers, and the basic requirement of micro-nano impact can be met. Meanwhile, compared with the prior art, the piezoelectric ceramic actuator 320 of the present invention is short in response time and high in impact speed, and can achieve impact under high strain conditions ($10^2$-$10^4$/s).

The annular support 330 can be configured as a single annular support 330, or may be provided as an annular support 330 composed of a plurality of parts. In this embodiment, to ensure the stability of the pressing rod 321, an inner ring and an outer ring are provided, the outer ring is provided with an opening, the piezoelectric ceramic actuator 320 and the opposite-top wedge blocks 340 are all arranged inside the inner ring, and a main body of the inner ring is arranged inside the outer ring. Meanwhile, one end of the pressing rod 321 passes through one side wall of the inner ring and one side wall of the outer ring and is arranged outside the outer ring, and the bearing 332 is arranged on the outer ring. According to the present invention, the inner ring and the outer ring are arranged, so that the stability of the pressing rod 321 is higher.

Conventionally, a tail portion (one end far away from the pressing rod 321) of the piezoelectric ceramic actuator 320 and the annular support 330 are difficult to completely fit. When the piezoelectric ceramic actuator 320 moves, a part of displacement generated by the piezoelectric ceramic actuator can be used to overcome a gap between the tail portion of the piezoelectric ceramic actuator 320 and the annular support 330, resulting in the actual displacement distance and the impact strength of the piezoelectric ceramic actuator 320 being less than a theoretical displacement distance and a theoretical impact strength, which further leads to distortion of the impact indentation test results. To solve the above problem, the inventors pre-tighten the piezoelectric ceramic actuator 320 by providing opposite-top wedge blocks 340.

Specifically, the opposite-top wedge blocks 340 are a pair of top blocks with a main body shape of a right triangle, and the two oblique sides thereof are fitted together. Meanwhile, a fastening bolt 331 is arranged on at least one side wall of the annular support 330, the fastening bolt 331 penetrates through the side wall of the annular support 330, and one end of the fastening bolt 331 arranged inside the annular support 330 is in contact with the side edges of the opposite-top wedge blocks 340. Before the piezoelectric ceramic actuator 320 is used, a transverse force is applied to the opposite-top wedge blocks 340 by screwing the fastening bolt 331, then two top blocks of the opposite-top wedge blocks tend to displace, and the transverse force is converted into a longitudinal pre-tightening force for the piezoelectric ceramic actuator 320, so that the pre-tightening for the piezoelectric ceramic actuator 320 is completed, and the impact indentation experiment results are more accurate.

To facilitate real-time monitoring of the force and displacement in the impact indentation process, a laser Doppler seismometer 350 is provided at an upper part of the dot matrix impact indentation module 300, and a reflective silicon wafer 360 matched with the laser Doppler seismometer 350 is arranged at one end of the pressing rod 321 close to the indenter 322. The force in the impact indentation process is monitored in real time through a micro-force sensor 370, and the displacement and the micro vibration in the impact indentation process can be monitored through the laser Doppler seismometer 350 and the reflective silicon wafer 360.

The rapid dot matrix micro-nano impact indentation testing system further comprises a clamp 400, wherein the clamp 400 clamps a test piece 500, and the test piece 500 faces the indenter 322.

As shown in FIG. 1, the clamp 400 mainly functions to clamp the test piece 500. Theoretically, any clamp 400 capable of clamping the test piece 500 and providing a certain support can be applied to the present invention. However, in practical use, the inventors find that the effect of clamping the test piece 500 by using a pneumatic clamp is better, the pneumatic clamp is convenient to clamp, does not need to be screwed by hands, and can achieve automatic control.

In this embodiment, to facilitate the operation of the technician, the clamp body of the pneumatic clamp is arranged on a movable platform 410, and the movable platform 410 can be driven by a motor, so as to achieve the up-and-down movement of the pneumatic clamp.

The rapid dot matrix micro-nano impact indentation testing system further comprises an imaging module 200, wherein the imaging module 200 comprises a microscope lens 210, and the microscope lens 210 is configured to observe and photograph the test piece 500.

Figure 3:
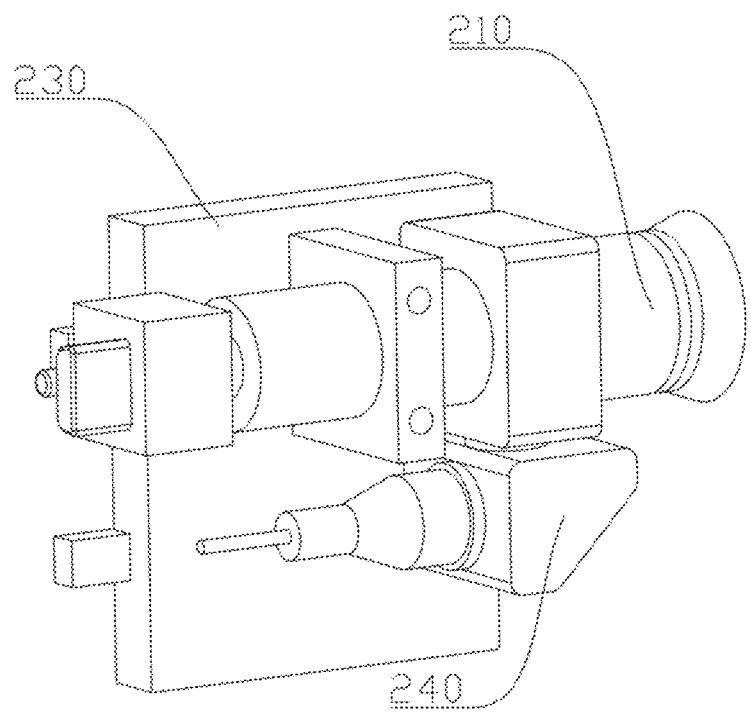
FIG. 3 is a schematic diagram of a structure of an imaging module.

As shown in FIGS. 1 and 3, in this embodiment, the microscope lens 210 is a metallographic microscope lens. To facilitate observation of the test piece 500, a mounting rib plate 220 is fixedly provided on one side of the Z-axis lifting stage 120, a sliding block 230 is arranged on the mounting rib plate 220, and then the microscope lens 210 is arranged on the sliding block 230. This arrangement enables the microscope lens 210 to move. For the microscope lens 210, a certain light source is usually required in the observation process, and therefore, in this embodiment, a light source 240 is further provided on the sliding block 230, and the light source 240 can cooperate with the microscope lens 210 to observe the test piece 500.

When in use, the test piece 500 is clamped and fixed by the clamp 400, the piezoelectric ceramic actuator 320 is pre-tightened by the opposite-top wedge blocks 340, the microscope lens 210 is moved to the front of the sample through the three-dimensional electric positioning module 100 and the sliding block 220 (in this case, the indenter 322 has moved to the front of the test piece 500), and the light source 240 is turned on to make the lens image. By observing the metallographic structure on the surface of the test piece 500, the test area is accurately selected.

Then, the indenter 322 is moved to the selected area to be tested through the precise control of the three-degree-of-freedom piezoelectric platform 310, the piezoelectric ceramic actuator 320 is powered, the piezoelectric ceramic actuator 320 drives the indenter 322 to perform impact indentation. After a single impact indentation is completed, the three-degree-of-freedom platform 310 achieves dot matrix positioning with nanometer-level positioning accuracy, and achieves matrix-type impact by performing multiple indentations. Meanwhile, the structural changes of the material surface during the indentation process are obtained through the microscope lens 210, and the displacement and impact force during the pressing process are monitored based on the laser Doppler seismometer 350 and the micro-force sensor 370.

The above descriptions are only preferred embodiments of the present invention, and are not intended to limit the present invention in any form. Although the preferred embodiments above have disclosed the present invention, they are not intended to limit the present invention. Any of those familiar with the technical field, without departing from the scope of the technical solutions of the present invention, can use the technical content disclosed above to make various changes and modify the technical content as equivalent changes of the equivalent embodiments. However, any simple modifications, equivalent changes and modifications made to the above embodiments according to the technical spirit of the present invention without departing from the content of the technical solutions of the present invention shall fall within the scope of the technical solutions of the present invention.

What is claimed is:

1. A rapid dot matrix micro-nano impact indentation testing system, comprising:
    a three-dimensional electric positioning module, wherein the three-dimensional electric positioning module comprises an XY translation stage and a Z-axis lifting stage, and the Z-axis lifting stage is arranged on the XY translation stage; the XY translation stage comprises a group of servo motors orthogonally arranged, an output end of each servo motor is connected to a fine grinding lead screw, the fine grinding lead screw is connected to a cross guide rail, the Z-axis lifting stage is arranged at an upper part of the cross guide rail, and a side surface of the lifting stage and a side surface of the cross guide rail are both provided with grating rulers;
    a dot matrix impact indentation module, wherein the dot matrix impact indentation module comprises a three-degree-of-freedom piezoelectric platform arranged on the Z-axis lifting stage, one surface of the three-degree-of-freedom piezoelectric platform is provided with a piezoelectric ceramic actuator, and one end of the piezoelectric ceramic actuator is connected to an indenter through a pressing rod; a piezoelectric stack and a bionic mantis claw with an arc-shaped tail end are arranged in the three-degree-of-freedom piezoelectric platform, and the bionic mantis claw amplifies a stroke of the piezoelectric stack based on a lever principle;
    a clamp, wherein the clamp clamps a test piece, and the test piece faces the indenter;
    an imaging module, wherein the imaging module comprises a microscope lens, and the microscope lens is configured to observe and photograph the test piece;
    wherein an annular support is provided on one surface of the three-degree-of-freedom piezoelectric platform, the piezoelectric ceramic actuator is arranged inside the annular support, a bearing is arranged at one end of the annular support, and the pressing rod passes through the bearing and is connected to the indenter;
    a pair of opposite-top wedge blocks are provided inside the other end of the annular support, the opposite-top wedge blocks are arranged between the top of the piezoelectric ceramic actuator and the annular support, a fastening bolt is arranged on at least one side of the annular support, the fastening bolt is configured to apply a transverse force to the opposite-top wedge blocks, and the opposite-top wedge blocks convert the transverse force into a pre-tightening force for the piezoelectric ceramic actuator; the opposite-top wedge blocks are a pair of top blocks with a main body shape of a right triangle and the two oblique sides thereof being fitted together, a fastening bolt is arranged on at least one side wall of the annular support at the same time, the fastening bolt penetrates through the side wall of the annular support, and one end of the fastening bolt arranged inside the annular support is in contact with side edges of the opposite-top wedge blocks.

2. The system according to claim 1, wherein the pressing rod is connected to a micro-force sensor, a laser Doppler vibrometer is provided at an upper part of the dot matrix impact indentation module, and a reflective silicon wafer matched with the laser Doppler vibrometer is provided at one end of the pressing rod close to the indenter.

3. The system according to claim 1, wherein a mounting plate is provided on one side of the three-degree-of-freedom piezoelectric platform, a sliding plate is provided on the mounting plate, and the imaging module is arranged on the sliding plate.

4. The system according to claim 1, wherein the clamp is a pneumatic clamp.

5. The system according to claim 1, wherein a mounting rib plate is fixedly provided on one side of the Z-axis lifting stage, a sliding block is provided on the mounting rib plate, and the imaging module is arranged on the sliding block.

* * * * *